(12) United States Patent
Canella et al.

(10) Patent No.: US 10,216,269 B2
(45) Date of Patent: Feb. 26, 2019

(54) APPARATUS AND METHOD FOR DETERMINING INTENT OF USER BASED ON GAZE INFORMATION

(71) Applicant: GM Global Technology Operations LLC, Detroit, MI (US)

(72) Inventors: David A. Canella, Toronto (CA); Jarvis Chau, Markham (CA); Eugenio DiMarco, Cobourg (CA)

(*) Notice: Subject to any disclaimer, the term of this patent is extended or adjusted under 35 U.S.C. 154(b) by 326 days.

(21) Appl. No.: 15/188,019

(22) Filed: Jun. 21, 2016

(65) Prior Publication Data
US 2017/0364147 A1   Dec. 21, 2017

(51) Int. Cl.
*G06F 17/30* (2006.01)
*G06F 3/01* (2006.01)
*G06N 7/00* (2006.01)

(52) U.S. Cl.
CPC ........ *G06F 3/013* (2013.01); *G06F 17/30312* (2013.01); *G06F 17/30528* (2013.01); *G06N 7/005* (2013.01)

(58) Field of Classification Search
CPC . G06F 3/013; G06F 17/3031; G06F 17/30528
See application file for complete search history.

(56) References Cited

U.S. PATENT DOCUMENTS

| | | | |
|---|---|---|---|
| 2015/0234459 A1* | 8/2015 | George-Svahn | ........ G06F 3/013 345/156 |
| 2017/0131719 A1* | 5/2017 | Micks | ................... B60W 40/08 |

* cited by examiner

*Primary Examiner* — Loc Tran

(57) ABSTRACT

A method and apparatus for tracking intent or awareness based on a gaze of a user are provided. The method includes receiving gaze information of the gaze of the user; based on the gaze information, determining whether a function of the vehicle was activated by the user; in response to determining that the function was activated by the user, generating and storing historical gaze information in a database; and in response to determining that the function is not activated by the user, calculating a probability that the function will be activated by the user during a processing cycle and generating and storing the historical gaze information in the database based on the calculated probability and size of the database. The apparatus and method may be used to track the gaze of a user of a vehicle and predict user behavior based on the historical gaze information.

16 Claims, 3 Drawing Sheets

APPARATUS AND METHOD FOR DETERMINING INTENT OF USER BASED ON GAZE INFORMATION

INTRODUCTION

Apparatuses and methods consistent with exemplary embodiments relate to gaze tracking and detection. More particularly, apparatuses consistent with exemplary embodiments relate to determining the intent of a user based on gaze information.

SUMMARY

One or more exemplary embodiments address the above issues by providing a gaze tracking apparatus. More particularly, one or more exemplary embodiments provide a gaze tracking apparatus that is capable of tracking a user's gaze and determining the intent and the situation awareness of the user.

According to an aspect of an exemplary embodiment, a method for tracking intent of a user based on a gaze of the user in a vehicle is provided. The method includes receiving gaze information associated with the gaze of the user; based on the gaze information, determining whether a function of the vehicle was activated by the user; in response to determining that the function was activated by the user, generating and storing historical gaze information in a database; and in response to determining that the function was not activated by the user, calculating a probability that the function will be activated by the user during a processing cycle based on the gaze information and generating and storing the historical gaze information in the database based on the calculated probability and a size of the database.

The generating and storing the historical gaze information based on the calculated probability and the size of the database may include generating and storing the historical gaze information in the database in response to the calculated probability being greater than a predetermined value and the size of the database being greater than a predetermined size.

The method may further include outputting a signal in response to the calculated probability being greater than the predetermined value and the size of the database being greater than a predetermined size.

The generating and storing the historical gaze information based on the calculated probability and the size of the database may include determining whether a follow up action of the user occurs; in response to determining that the follow up action occurs, generating and storing the historical gaze information along with corresponding information indicating that the follow up action occurs in the database; and in response to determining that the follow up action is not required, generating and storing the historical gaze information along with corresponding information indicating that the follow up action is not required in the database.

The historical gaze information may include at least one from among an action of the user, visual information location, target name, gaze location, dwell time on target, number of distinct glances and total dwell time.

According to an aspect of another exemplary embodiment, a method for tracking awareness of a user based on a gaze of the user is provided. The method includes receiving gaze information associated with the gaze of the user towards a specific target; based on the gaze information, determining whether a predetermined time between a previous gaze and a current gaze to a same area has been exceeded; in response to determining that the predetermined time is exceeded, generating and storing historical gaze information in a database; and in response to determining that the predetermined time is not exceeded, calculating a probability that the user has completed gazing at a first area and generating and storing the historical gaze information in the database based on the calculated probability and a size of the database.

The generating and storing the historical gaze information based on the calculated probability and the size of the database may include generating and storing the historical gaze information in the database in response to the calculated probability being greater than a predetermined value and the size of the database being greater than a predetermined size.

The method may further include outputting a signal in response to the calculated probability being greater than the predetermined value and the size of the database being greater than a predetermined size.

The generating and storing the historical gaze information based on the calculated probability and the size of the database may further include determining whether a follow up action of the user occurs; in response to determining that the follow up action occurs, generating and storing the historical gaze information along with corresponding information indicating that the follow up action occurs in the database; and in response to determining that the follow up action is not required, generating and storing the historical gaze information along with corresponding information indicating that the follow up action is not required in the database.

The historical gaze information may include at least one from among an action of the user, visual information location, target name, gaze location, dwell time on target, number of distinct glances and total dwell time.

According to an aspect of another exemplary embodiment, an apparatus for tracking intent of a user based on a gaze of the user is provided. The apparatus includes: at least one memory comprising computer executable instructions; and at least one processor configured to read and execute the computer executable instructions. The computer executable instructions cause the at least one processor to: receive gaze information associated with the gaze of the user; based on the gaze information, determine whether a function was activated by the user; in response to determining that the function was activated by the user, generate and store historical gaze information in a database; and in response to determining that the function was not activated by the user, calculate a probability that the function will be activated by the user during a processing cycle based on the gaze information and generate and store the historical gaze information in the database based on the calculated probability and a size of the database.

The computer executable instructions may further cause the at least one processor to generate and store the historical gaze information based on the calculated probability and the size of the database by generating and storing the historical gaze information in the database in response to the calculated probability being greater than a predetermined value and the size of the database being greater than a predetermined size.

The computer executable instructions may further cause the at least one processor to output a signal in response to the calculated probability being greater than the predetermined value and the size of the database being greater than a predetermined size.

The computer executable instructions may further cause the at least one processor to generate and store the historical gaze information based on the calculated probability and the size of the database by: determining whether a follow up action of the user occurs; in response to determining that the follow up action occurs, generating and storing the historical gaze information along with corresponding information indicating that the follow up action occurs in the database; and in response to determining that the follow up action is not required, generating and storing the historical gaze information along with corresponding information indicating that the follow up action is not required in the database.

The historical gaze information may include at least one from among an action of the user, visual information location, target name, gaze location, dwell time on target, number of distinct glances and total dwell time.

According to an aspect of another exemplary embodiment, an apparatus for tracking awareness of a user based on a gaze of the user is provided. The apparatus includes: at least one memory comprising computer executable instructions; and at least one processor configured to read and execute the computer executable instructions. The computer executable instructions causing the at least one processor to: receive gaze information associated with the gaze of the user; based on the gaze information, determine whether a predetermined time between a previous gaze and a current gaze to a same area has been exceeded; in response to determining that the predetermined time is exceeded, generate and store historical gaze information in a database; and in response to determining that the predetermined time is not exceeded, calculate a probability that the user has completed gazing at a first area and generate and store the historical gaze information in the database based on the calculated probability and a size of the database.

The computer executable instructions may further cause the at least one processor to generate and store the historical gaze information based on the calculated probability and the size of the database by generating and storing the historical gaze information in the database in response to the calculated probability being greater than a predetermined value and the size of the database being greater than a predetermined size.

The computer executable instructions may further cause the at least one processor to output a signal in response to the calculated probability being greater than the predetermined value and the size of the database being greater than the predetermined size.

The computer executable instructions may further cause the at least one processor to generate and store the historical gaze information based on the calculated probability and the size of the database by: determining whether a follow up action of the user occurs; in response to determining that the follow up action occurs, generating and storing the historical gaze information along with corresponding information indicating that the follow up action occurs in the database; and in response to determining that the follow up action is not required, generating and storing the historical gaze information along with corresponding information indicating that the follow up action is not required in the database.

The historical gaze information may include at least one from among an action of the user, visual information location, target name, gaze location, dwell time on target, number of distinct glances and total dwell time.

Other objects, advantages and novel features of the exemplary embodiments will become more apparent from the following detailed description of exemplary embodiments and the accompanying drawings.

DETAILED DESCRIPTION

Figure 1:
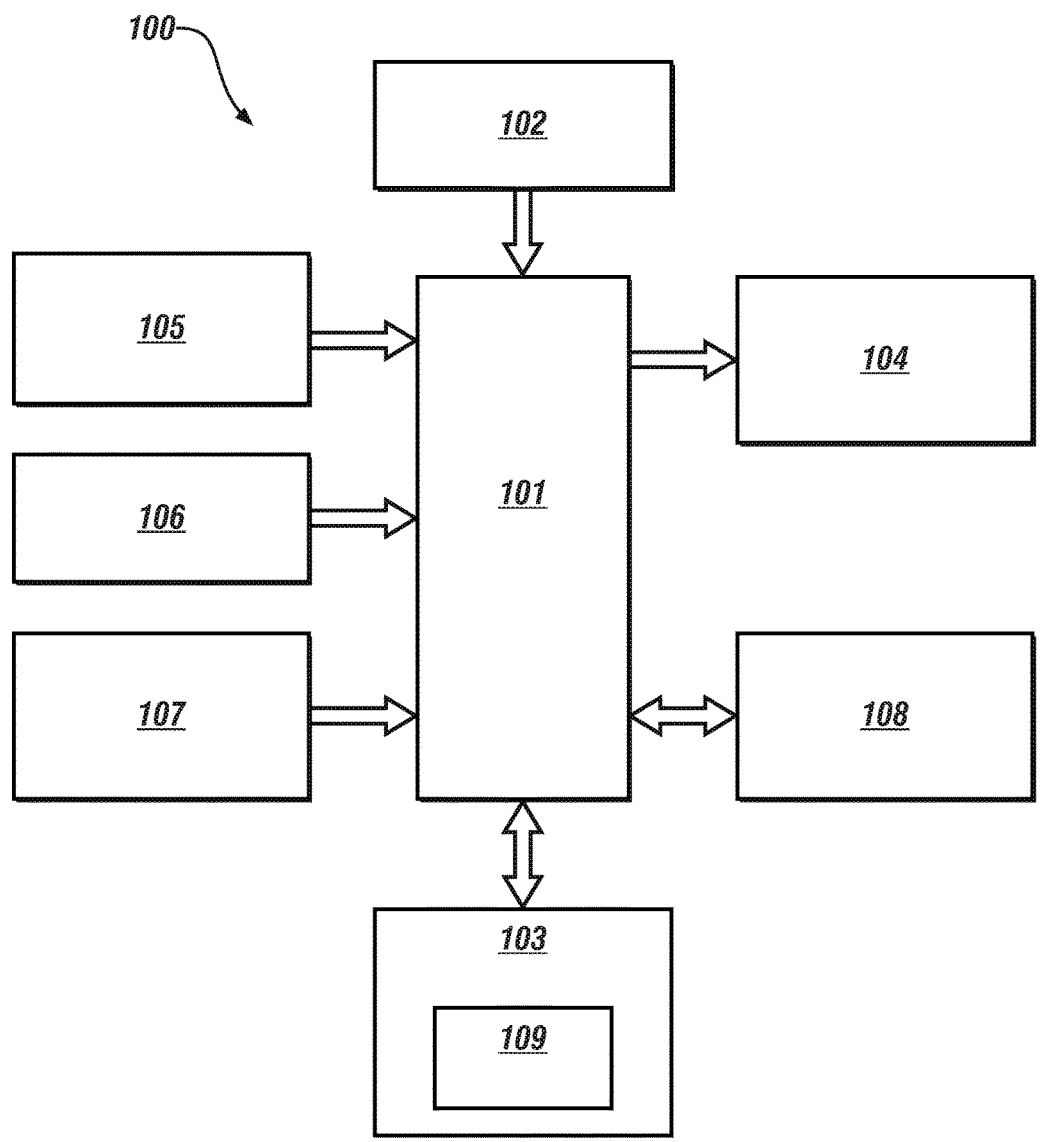
FIG. 1 shows a block diagram of a gaze tracking apparatus according to an exemplary embodiment.

Apparatuses for tracking a gaze of a user use sensors that detect actions performed by a user and that output information corresponding to the user's actions. The information from the sensors is then used to determine information associated with the user's gaze.

A gaze tracking apparatus and method thereof will now be described in detail with reference to FIGS. 1-3 of the accompanying drawings in which like reference numerals refer to like elements throughout. The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "formed on," or "disposed on" a second element, the first element may be connected directly to, formed directly on or disposed directly on the second element or there may be intervening elements between the first element and the second element, unless it is stated that a first element is "directly" connected to, formed on, or disposed on the second element. In addition, if a first element is configured to "receive" information from a second element, the first element may receive the information directly from the second element, receive the information via a bus, receive the information via a network, or receive the information via intermediate elements, unless the first element is indicated to receive information "directly" from the second element.

Throughout the disclosure, one or more of the elements disclosed may be combined into a single device or combined into one or more devices. In addition, individual elements may be provided on separate devices.

FIG. 1 shows a block diagram of a gaze tracking apparatus 100 according to an exemplary embodiment. As shown in FIG. 1, the gaze tracking apparatus 100, according to an exemplary embodiment, includes a controller 101, a power supply 102, a storage 103, an output 104, a gaze detection sensor 105, a user input 106, a vehicle status input 107, and a communication device 108. However, the gaze tracking apparatus 100 is not limited to the aforementioned configuration and may be configured to include additional elements and/or or omit one or more of the aforementioned elements.

The controller 101 controls the overall operation and function of the gaze tracking apparatus 100. The controller 101 may control one or more of the storage 103, the output 104, the gaze detection sensor 105, the user input 106, the vehicle status input 107, and the communication device 108 of the gaze tracking apparatus 100. The controller 101 may include one or more from among a processor, a microprocessor, a central processing unit (CPU), a graphics processor, Application Specific Integrated Circuits (ASICs), Field- Programmable Gate Arrays (FPGAs), state machines, and a combination of hardware, software and firmware components.

The power supply 102 provides power to one or more of the storage 103, the output 104, the gaze detection sensor 105, the user input 106, the vehicle status input 107, and the communication device 108 of the gaze tracking apparatus 100. The power supply 102 may include one or more from a battery, an outlet, a capacitor, a solar energy cell, a generator, a wind energy device, an alternator, etc.

The storage 103 is configured to store information and for retrieving information used by the gaze tracking apparatus 100. The storage 103 may be controlled by the controller 101 to store and retrieve vehicle context information, historical gaze information, etc. The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The storage 103 may include a database 109 that is configured to store the historical gaze information. The historical gaze information may include one or more from among an action of the user, visual information location, target name, gaze location, dwell time on target, number of distinct glances and total dwell time. In addition, information indicating whether a follow up action occurs may be stored along with the historical gaze information in the database 109. The database 109 may become an increasingly large database used to make increasingly accurate predictions. For example, aggregate anonymized data such as historical gaze information may be transmitted to secure servers via communication device 108. The aggregate anonymized data may be stored at the servers and transmitted to other vehicles and used for determining intent of a second user based on historical gaze information of a first user. In addition, aggregate anonymized data may be stored in searchable databases. The aggregate anonymized can be searched for and retrieved to build models of driver performance data for product development and system calibration.

The database 109 may also store information on one or more from among skin conductance, heart rate, blood pressure, blood oxygen level, fatigue measurements, time of day, weather, traffic, and trip. Trip information may include a length of a trip, a length of the trip, a time to destination, and time since departure. The information may be detected by one or more sensors in the vehicle.

An action of a user may be any identifiable physical interaction that a user has with a system in which a method for determining the intent of the user is performed. For example, an action of the user may be a button press, or whether hands are put on or taken off of the steering wheel.

The target name may be an interface name or a name of a location in a vehicle interior where users may look. For example, a windshield, a center console, or a door may be target names as they may be used to classify areas of vehicle interior. The same location may be given multiple target names, all of which may be stored in storage. For example, the area containing the fuel gauge may by simultaneous described as "Fuel Gauge," "Gauge Cluster," "Instrument Panel," and "Away From Windscreen." The target names may vary depending on the vehicle or system where the method for determining the intent of the user is performed. As such, the target name may also include information identifying a type of vehicle that includes the target.

The gaze location may be the location where the user is looking. The dwell time on target may be the amount of time that a user spends looking at a given location/target before looking at something else. The number of distinct glances may be the number of times the user looks at an area after looking at another area. The total dwell time may be the sum of the dwell times for the number of distinct glances at a given area.

Visual information location may be a physical location in a three dimensional (3D) space around a user in which visual information is presented. For example, a gauge cluster may be located forward and below the eyes of the user and its location may be specified as being a given distance (x, y, and z) from the eyes of the user or other fixed point of reference.

The output 104 outputs information in a visual, audible or haptic form or outputs a signal to cause another device to output information in the aforementioned forms. The output 104 may be controlled by the controller 101 to provide outputs to the user of the gaze tracking apparatus 100. The output 104 may include one or more from among a speaker, a display, a heads up display, haptic feedback device, a vibration device, a tap-feedback device, a holographic display, etc.

The gaze detection sensor 105 is configured to detect a location of a gaze of the user and a direction of movement of the gaze of the user and provide information on the location and the direction to the gaze tracking apparatus 100 and the controller 101. The gaze detection sensor 105 may include one or more from among an infrared camera, a camera, a near infra-red camera, an active light camera, an ultrasonic sensor, a radar device, etc. The gaze detection sensor 105 may provide the information to the controller 101 to be processed so that the controller 101 may perform functions based on one or more of the location of a gaze of the user, the location of the user, and the direction of movement of the gaze of the user.

The user input 106 is configured to provide inputs information and commands to the gaze tracking apparatus 100. The user input 106 may be used to provide user inputs, etc. to the controller 101. The user input 106 may include one or more from among a touchscreen, a keyboard, a soft keypad, a button, a motion detector, a voice input detector, a microphone, a camera, a trackpad, a mouse, a touchpad, etc.

The vehicle status input 107 is configured to receive vehicle context information and provide the information to the gaze tracking apparatus 100. The vehicle status input 107 may be used to provide vehicle context information, etc. to the controller 101. The vehicle context information may be received from sensors or devices that capture information about the vehicle or may be read from storage 103 where the vehicle context information is stored or received via communication device 108. The vehicle context information may be provided by sensors or devices such as one or more from among a Global Positioning System (GPS) device, a speedometer, an odometer, an engine sensor, an emission sensor, a transmission sensor, a tire pressure sensor, a door sensor, a trunk sensor, a window sensor, an interior/exterior temperature sensor, a barometric pressure sensor, an acceleration sensor, a gyroscopic sensor, a touch force or pressure sensor, a seat sensor, a passenger sensor, a collision sensor, an external object detector, an ultrasonic sensor, a radar sensor, a thermometer, an altimeter, an electronic control unit (e.g., an electronic controller, etc.), a car light activation sensor, an ambient light sensor, a car key sensor, a car information and entertainment device (i.e., an infotainment device), a communication device, etc.

The vehicle context information may include information on one or more from among an event associated with a vehicle, steering of a vehicle, turn indicator status, a speed of a vehicle, a location of a vehicle, an engine event or status, emission status, revolutions per minute of an engine, transmission status, tire pressure, door open/close status, trunk open/close status, window open/close status, interior/exterior temperature, barometric pressure, altitude of a vehicle, acceleration of a vehicle, user input, user applied pressure to an object or button in a vehicle, whether a passenger is in a seat, location and speed of external objects around the vehicle, which lights of a vehicle are activated, whether a car key is present in a vehicle, a currently displayed screen on a display in a vehicle, daytime or night time status, an amount of ambient light, a status of a vehicle, a status of a setting of a vehicle, and a location of a function that is executable by the user.

The communication device 108 may be used by gaze tracking apparatus 100 to communicate with various types of external apparatuses according to various communication methods. The communication device 108 may be used to provide gaze information, vehicle context information, historical gaze information, historical usage information, etc., to the controller 101 and the gaze tracking apparatus 100.

The communication device 108 may include various communication modules such as a broadcast receiving module, a near field communication (NFC) module, a GPS module, and a wireless communication module. The broadcast receiving module may include a terrestrial broadcast receiving module including an antenna to receive a terrestrial broadcast signal, a demodulator, and an equalizer, and a digital multimedia broadcasting (DMB) module to receive and process a DMB broadcast signal. The NFC module is a module that communicates with an external apparatus located at a nearby distance according to an NFC method. The GPS module is a module that receives a GPS signal from a GPS satellite and detects a current location. The wireless communication module is a module that is connected to an external network by using a wireless communication protocol such as Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long term evolution (LTE), Bluetooth, or ZigBee.

According to an exemplary embodiment, the controller 101 of the gaze tracking apparatus 100 is configured to receive gaze information associated with the gaze of the user from the gaze detection sensor 105. The controller 101 determines whether a function of the vehicle was activated by the user. If the controller 101 determines that the function was activated by the user, the controller 101 generates and stores historical gaze information in a database 109. If the controller 101 determines that the function was not activated by the user, the controller 101 calculates a probability that the function will be activated by the user during a processing cycle based on the gaze information. A cycle may be the amount of time required to collect a predetermined number of samples from the gaze tracking apparatus.

The controller 101 then controls to generate and store the historical gaze information in the database 109 if the calculated probability is greater than a predetermined value and the size of the database 109 is greater than a predetermined size. The predetermined size of the database may be adjusted based on an amount of data required to predict a probability that the function will be activated by the user during a processing cycle. The controller 101 may also control to output a signal in response to the calculated probability being greater than the predetermined value and the size of the database 109 being greater than a predetermined size. The predetermined value of the probability may be adjusted to limit unwanted triggers of the function. For example, the greater the predetermined value required for the calculated probability, the less likely an unwanted function will be triggered. In one example, the output signal may be sent to trigger a function such as a function of a vehicle.

According to another exemplary embodiment, the controller 101 of the gaze tracking apparatus 100 is configured to receive gaze information associated with the gaze of the user from the gaze detection sensor 105. The controller 101 determines whether a predetermined time between a previous gaze and a current gaze to the same target has been exceeded based on the gaze information. If the controller 101 determines that the predetermined time is exceeded, the controller 101 generates and stores historical gaze information in a database 109. If the controller 101 determines that the predetermined time is not exceeded, the controller 101 calculates a probability the user has completed gazing at a first area based on the gaze information.

The predetermined time may be a static preset period of time. Alternatively, the predetermined time may be continuously updated based on a running average of a total amount of time a person gazes at selected targets.

The controller 101 then controls to generate and store the historical gaze information in the database 109 if the calculated probability is greater than a predetermined value and the size of the database 109 is greater than a predetermined size. The controller 101 may also control to output a signal in response to the calculated probability being greater than the predetermined value and the size of the database 109 being greater than a predetermined size. In one example, the output signal may be sent to trigger a function, e.g., a function of a vehicle.

The controller 101 may control to generate and store the historical gaze information based on the calculated probability and the size of the database 109 by determining whether a follow up action of the user occurs. The controller 101 may then generate and store the historical gaze information along with corresponding information indicating that a follow up action occurs in the database 109 if the follow up action of the user occurs or generate and store the historical gaze information along with corresponding information indicating that no follow up action occurs in the database 109 if the follow up action of the user is not required. Whether a follow up action occurs or is required is an indicator that is stored and analyzed to determine when inaccurate predictions occur. This indication may be used to calculate the probability that the user will perform an action and the probability that the user has finished gazing at a target.

Figure 2:
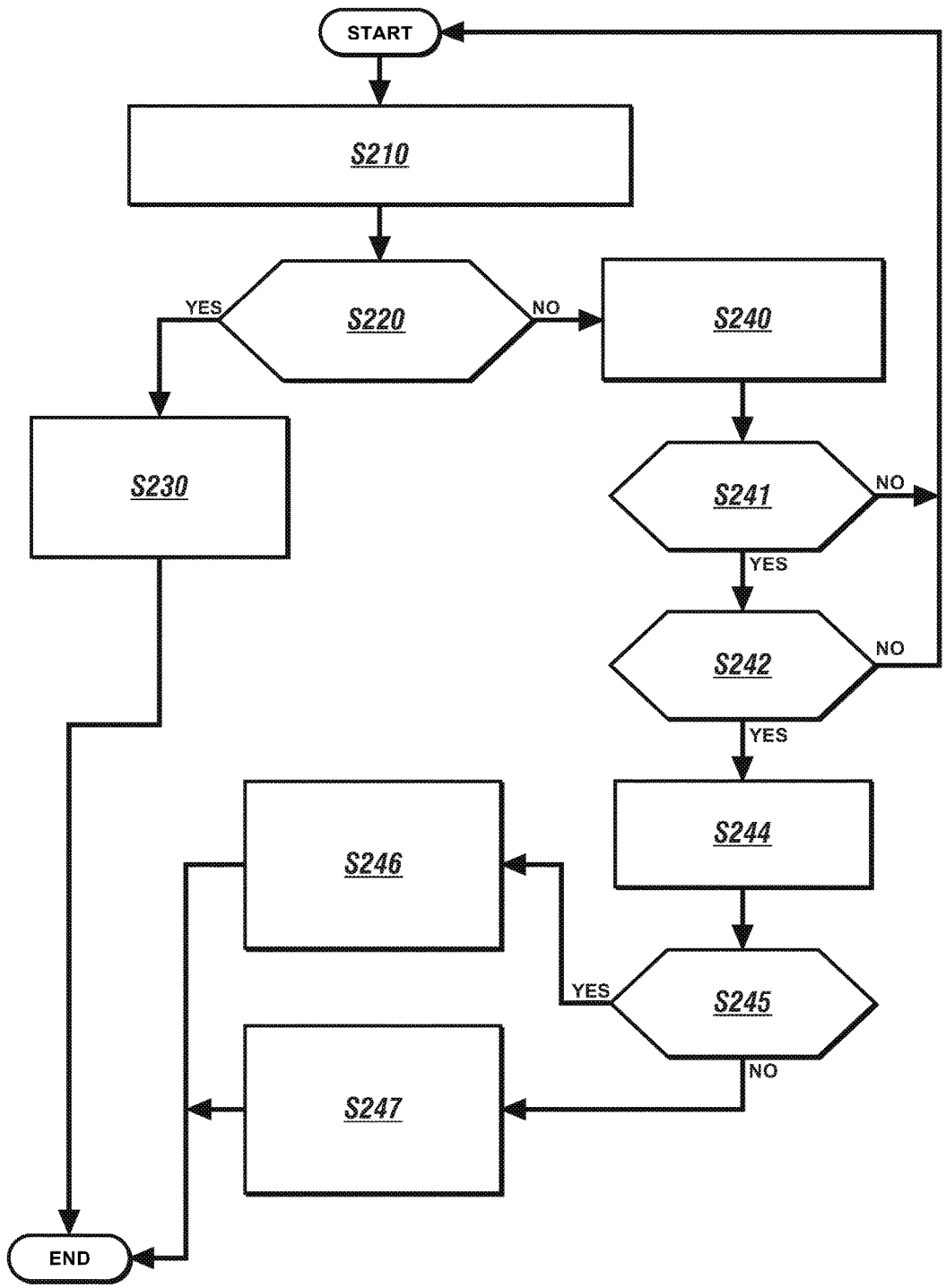
FIG. 2 shows a flowchart of a method for determining the intent of the user according to an exemplary embodiment.

FIG. 2 shows a flowchart of a method for determining the intent of the user according to an exemplary embodiment. For example, the intent of the user may be the intent of the user to carry out an action. The process of FIG. 2 may be repeated continuously in order to generate a database to model an intent of the user to carry out the action.

The method of FIG. 2 may be performed by the gaze tracking apparatus 100 or may encoded into a computer readable medium as instructions that are executable by a computer to perform the method. As shown in the method of FIG. 2, performing calculations on gaze information collected over time along with historical gaze information may be used to predict when and how an individual intends to act in relation to the target of the visual attention of the individual.

Referring to FIG. 2, gaze information associated with the gaze of the user is received in operation S210. In particular, when an individual directs his or her attention at a detectable area, the gaze tracking apparatus may identify location coordinates of the area being gazed at by the individual or of the individual, the individual's gaze, or a portion of the individual. The coordinates may then be time stamped and stored as gaze information.

In operation S220, it is determined whether the user is performing an action. If it is determined that the user is performing an action in operation S220—Yes, then a new database entry of historical gaze information is created in operation S230. The historical gaze information may include one or more from among an action of the user, visual information location, target name, gaze location, dwell time on target, number of distinct glances and total dwell time.

If it is determined that the user is not performing an action in operation S220—No, then the probability that a user action will occur during the current cycle is calculated in operation S240. The probability that the user will perform an action may be calculated according to the following equation:

$$P(A) = \frac{\Sigma(f_s - f_a k)}{N}, \qquad \text{EQUATION 1}$$

where $f_s$=frequency of occurrences of actions with similar characteristics (E.g., visual information location, target name, gaze location, dwell time on target, number of distinct glance, and total dwell time etc.) as when action occurred, $f_a$=frequency of occurrences with similar characteristics where follow-up action was required, k=Correction factor, and N=Total number of samples recorded for this location in the database.

The calculated probability may also take into consideration information on other factors such as information on one or more from among skin conductance, heart rate, blood pressure, blood oxygen level, fatigue measurements, time of day, weather, traffic, and trip. Trip information may include a distance of a trip, a time to destination, and a time since departure. For example, the calculated probability may be weighted based on the above discussed factors.

If the probability is greater than or equal to a threshold value (i.e., predetermined value) (operation S241—Yes) and a size of the database which is used to determine the probability is greater than a minimum size (operation S242—Yes), an output signal is sent (operation S244). In one example, the output signal may be sent to trigger a function such as a function of a vehicle. In another example, the output signal may be sent when a thumb or hand of a user is removed from the steering wheel or moves towards a target area. The removal of hands or fingers from the steering wheel or other device can be detected by making use of capacitive or piezoelectric sensors to identify when fingers and/or hands shift position on the steering wheel as an input to predicting when an action will occur. If the probability is less than the threshold value (operation S241—No), the method returns to start to receive gaze information associated with the gaze of the user in operation S210.

In operation S245, it is determined whether a follow up action of the user occurs. For example, a follow up action may be a user correction or additional user action to address a system predicted and/or performed function. The user correction or additional user action may be the changing of a predicted output display screen. If a follow up action occurs (operation S245—Yes), a new database entry of historical gaze information indicating a follow up action occurs (operation S246). If a follow up action is not required (operation S245—No), a new database entry of historical gaze information indicating a follow up action is not required (operation S247). The historical gaze information may include one or more from among an action of the user, visual information location, target name, gaze location, dwell time on target, number of distinct glances and total dwell time. In addition, raw gaze information may be continuously recorded while the method is being performed.

Figure 3:
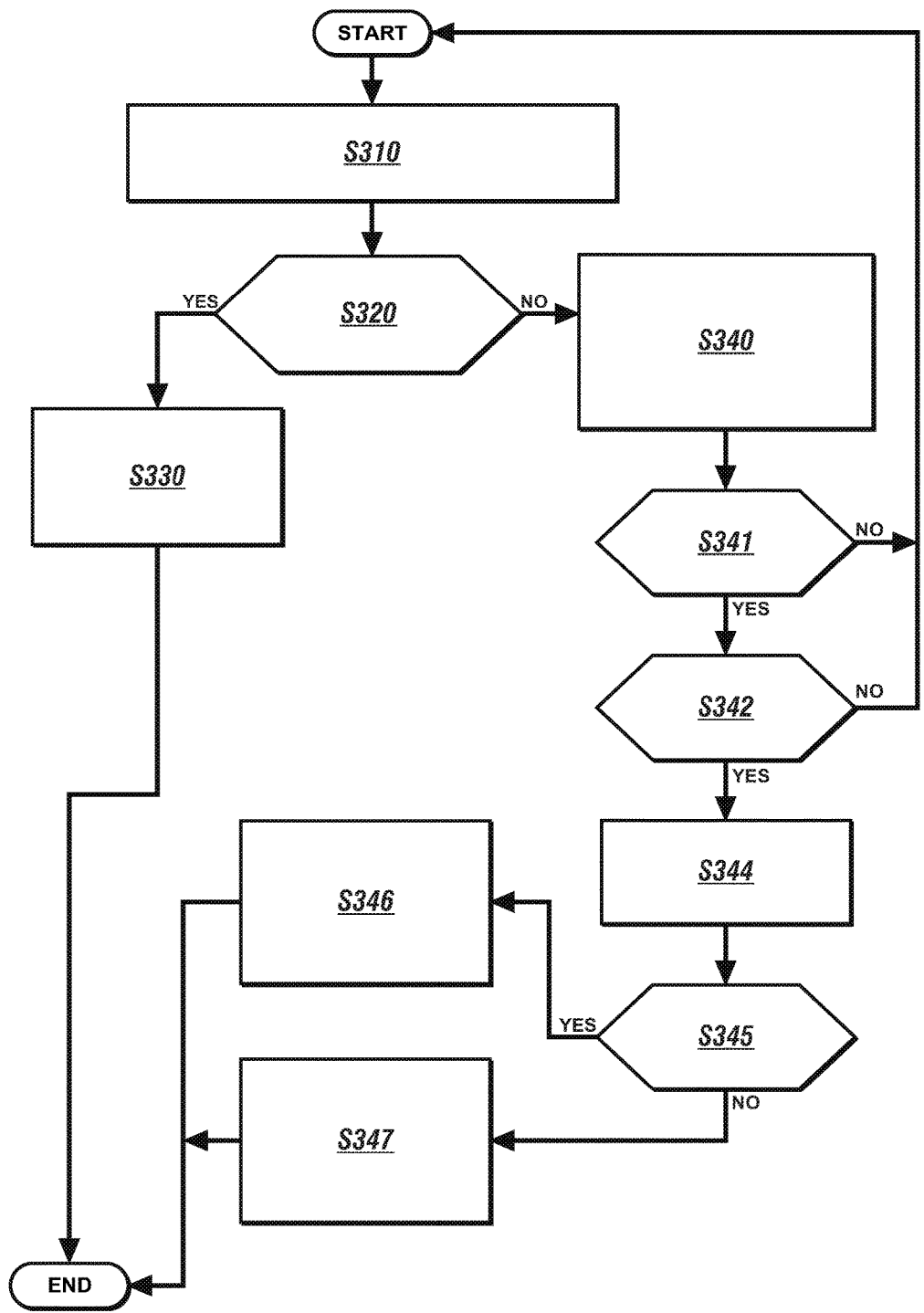
FIG. 3 shows a flowchart of a method for determining the situation awareness of the user according to an exemplary embodiment.

FIG. 3 shows a flowchart a method for determining the situation awareness of the user according to an exemplary embodiment. The method of FIG. 3 may be used to generate and update the database 109 or perform functions based on the tracking of the user's awareness of the situation that the user is in. For example, situation awareness may indicate whether the user has perceived and processed presently displayed information or the present environment of the user.

The method of FIG. 3 may be performed by the gaze tracking apparatus 100 or may encoded into a computer readable medium as instructions that are executable by a computer to perform the method. As shown in the method of FIG. 3, performing calculations on gaze information collected over time along with historical gaze information may be used to predict whether an individual has perceived information that is presented visually and the time it takes the individual to process the information. The process of FIG. 3 may be repeated continuously in order to generate a database to model situation awareness of the user.

Referring to FIG. 3, gaze information associated with the gaze of the user is received in operation S310. In particular, when an individual directs his or her attention at a detectable area, the gaze tracking apparatus may identify location coordinates of the area being gazed at by the individual or of the individual, the individual's gaze, or a portion of the individual. The coordinates may then be time stamped and stored as gaze information.

In operation S320, it is determined whether a threshold time (i.e., predetermined time) between successive gazes is exceeded. If the threshold time is exceeded in operation S320—Yes, a new database entry of historical gaze information is created in operation S330. The historical gaze information may include one or more from among an action of the user, visual information location, target name, gaze location, dwell time on target, number of distinct glances and total dwell time.

If it is determined that the threshold time is not exceeded in operation S320—No, then the probability that a user has finished gazing at the target area and is aware of all information in target area may be calculated in operation S340. The probability that the user has finished gazing at the target area may be calculated according to the following equation:

$$P(G) = \frac{\Sigma(f_s - f_a k)}{N}, \qquad \text{EQUATION 1}$$

where $f_s$=frequency of occurrences of actions with similar characteristics (e.g., visual information location, target name, gaze location, dwell time on target, number of distinct glance, and total dwell time, etc.) as a target area where the gaze is directed to, $f_a$=frequency of occurrences with similar characteristics where follow-up action was required, k=Correction factor, and N=total number of samples recorded for this location in the database.

The calculated probability may also take into consideration information on other factors such as information on one or more from among skin conductance, heart rate, blood pressure, blood oxygen level, fatigue measurements, time of day, weather, traffic, and trip. Trip information may include a length of a trip, a length of the trip, a time to destination, and time since departure. For example, the calculated probability may be weighted based on the above discussed factors.

If the probability is greater than or equal to a threshold value (i.e., predetermined value) (operation S341—Yes) and a size of the database which is used to determine the probability is greater than a minimum size (operation S342—Yes), an output signal is sent (operation S344). In one example, the output signal may be sent to trigger a function. In another example, the output signal may be sent when a thumb or hand of a user is removed from the steering wheel or moves towards a target area. The removal of hands or fingers from the steering wheel or other device can be detected by making use of capacitive or piezoelectric sensors to identify when fingers and/or hands shift position on the steering wheel as an input to predicting when an action will occur. If the probability is less than the threshold value (operation S341—No), the method returns to start to receive gaze information associated with the gaze of the user in operation S310.

In operation S345, it is determined whether a follow up action of the user occurs. For example, a follow up action may be a user correction or additional user action of a system predicted and/or performed function. The user correction or additional user action may be the changing of a predicted output display screen. If a follow up action occurs (operation S345—Yes), a new database entry of historical gaze information indicating a follow up action occurs (operation S346). If a follow up action is not required (operation S345—No), a new database entry of historical gaze information indicating a follow up action is not required (operation S347). The historical gaze information may include one or more from among an action of the user, visual information location, target name, gaze location, dwell time on target, number of distinct glances and total dwell time. In addition, raw gaze information may be continuously recorded while the method is being performed.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for tracking intent of a user based on a gaze of the user in a vehicle, the method comprising:
   receiving gaze information associated with the gaze of the user;
   based on the gaze information, determining whether a function of the vehicle was activated by the user;
   in response to determining that the function was activated by the user, generating and storing historical gaze information in a database; and
   in response to determining that the function was not activated by the user, calculating a probability that the function will be activated by the user during a processing cycle based on the gaze information and generating and storing the historical gaze information in the database based on the calculated probability and a size of the database,
   wherein the generating and storing the historical gaze information based on the calculated probability and the size of the database comprises generating and storing the historical gaze information in the database in response to the calculated probability being greater than a predetermined value and the size of the database being greater than a predetermined size.

2. The method of claim 1, further comprising outputting a signal in response to the calculated probability being greater than the predetermined value and the size of the database being greater than a predetermined size.

3. The method of claim 2, wherein the generating and storing the historical gaze information based on the calculated probability and the size of the database further comprises:
   determining whether a follow up action of the user occurs;
   in response to determining that the follow up action occurs, generating and storing the historical gaze information along with corresponding information indicating that the follow up action occurs in the database; and
   in response to determining that the follow up action is not required, generating and storing the historical gaze information along with corresponding information indicating that the follow up action is not required in the database.

4. The method of claim 2, wherein the historical gaze information comprises at least one from among an action of the user, visual information location, target name, gaze location, dwell time on target, number of distinct glances and total dwell time.

5. A method for tracking awareness of a user based on a gaze of the user, the method comprising:
   receiving gaze information associated with the gaze of the user;
   based on the gaze information, determining whether a predetermined time between a previous gaze and a current gaze to a same area has been exceeded, the predetermined time being a period of time between an end of the previous gaze and a start of the current gaze;

in response to determining that the predetermined time is exceeded, generating and storing historical gaze information in a database; and in response to determining that the predetermined time is not exceeded, calculating a probability that the user has completed gazing at a first area and generating and storing the historical gaze information in the database based on the calculated probability and a size of the database, wherein the generating and storing the historical gaze information based on the calculated probability and the size of the database comprises generating and storing the historical gaze information in the database in response to the calculated probability being greater than a predetermined value and the size of the database being greater than a predetermined size.

6. The method of claim 5, further comprising outputting a signal in response to the calculated probability being greater than the predetermined value and the size of the database being greater than a predetermined size.

7. The method of claim 6, wherein the generating and storing the historical gaze information based on the calculated probability and the size of the database further comprises:
   determining whether a follow up action of the user occurs;
   in response to determining that the follow up action occurs, generating and storing the historical gaze information along with corresponding information indicating that the follow up action occurs in the database; and
   in response to determining that the follow up action is not required, generating and storing the historical gaze information along with corresponding information indicating that the follow up action is not required in the database.

8. The method of claim 6, wherein the historical gaze information comprises at least one from among an action of the user, visual information location, target name, gaze location, dwell time on target, number of distinct glances and total dwell time.

9. An apparatus for tracking intent of a user based on a gaze of the user, the apparatus comprising:
   at least one memory comprising computer executable instructions; and
   at least one processor configured to read and execute the computer executable instructions, the computer executable instructions causing the at least one processor to:
   receive gaze information associated with the gaze of the user;
   based on the gaze information, determine whether a function was activated by the user;
   in response to determining that the function was activated by the user, generate and store historical gaze information in a database; and
   in response to determining that the function was not activated by the user, calculate a probability that the function will be activated by the user during a processing cycle based on the gaze information and generate and store the historical gaze information in the database based on the calculated probability and a size of the database,
   wherein the computer executable instructions further cause the at least one processor to generate and store the historical gaze information based on the calculated probability and the size of the database by generating and storing the historical gaze information in the database in response to the calculated probability being greater than a predetermined value and the size of the database being greater than a predetermined size.

10. The apparatus of claim 9, wherein the computer executable instructions further cause the at least one processor to output a signal in response to the calculated probability being greater than the predetermined value and the size of the database being greater than a predetermined size.

11. The apparatus of claim 10, wherein the computer executable instructions further cause the at least one processor to generate and store the historical gaze information based on the calculated probability and the size of the database by:
   determining whether a follow up action of the user occurs;
   in response to determining that the follow up action occurs, generating and storing the historical gaze information along with corresponding information indicating that the follow up action occurs in the database; and
   in response to determining that the follow up action is not required, generating and storing the historical gaze information along with corresponding information indicating that the follow up action is not required in the database.

12. The apparatus of claim 10, wherein the historical gaze information comprises at least one from among an action of the user, visual information location, target name, gaze location, dwell time on target, number of distinct glances and total dwell time.

13. An apparatus for tracking awareness of a user based on a gaze of the user, the apparatus comprising:
   at least one memory comprising computer executable instructions; and
   at least one processor configured to read and execute the computer executable instructions, the computer executable instructions causing the at least one processor to:
   receive gaze information associated with the gaze of the user;
   based on the gaze information, determine whether a predetermined time between a previous gaze and a current gaze to a same area has been exceeded, the predetermined time being a period of time between an end of the previous gaze and a start of the current gaze;
   in response to determining that the predetermined time is exceeded, generate and store historical gaze information in a database; and
   in response to determining that the predetermined time is not exceeded, calculate a probability that the user has completed gazing at a first area and generate and store the historical gaze information in the database based on the calculated probability and a size of the database,
   wherein the computer executable instructions further cause the at least one processor to generate and store the historical gaze information based on the calculated probability and the size of the database by generating and storing the historical gaze information in the database in response to the calculated probability being greater than a predetermined value and the size of the database being greater than a predetermined size.

14. The apparatus of claim 13, wherein the computer executable instructions further cause the at least one processor to output a signal in response to the calculated probability being greater than the predetermined value and the size of the database being greater than the predetermined size.

15. The apparatus of claim 14, wherein the computer executable instructions further cause the at least one processor to generate and store the historical gaze information based on the calculated probability and the size of the database by:
- determining whether a follow up action of the user occurs;
- in response to determining that the follow up action occurs, generating and storing the historical gaze information along with corresponding information indicating that the follow up action occurs in the database; and
- in response to determining that the follow up action is not required, generating and storing the historical gaze information along with corresponding information indicating that the follow up action is not required in the database.

16. The apparatus of claim 14, wherein the historical gaze information comprises at least one from among an action of the user, visual information location, target name, gaze location, dwell time on target, number of distinct glances and total dwell time.

* * * * *